(12) United States Patent
Catlin et al.

(10) Patent No.: US 10,260,677 B1
(45) Date of Patent: Apr. 16, 2019

(54) ADJUSTABLE SHOULDER REST FOR CAMERA

(71) Applicant: Panavision International, L.P., Woodland Hills, CA (US)

(72) Inventors: Vince Catlin, Thousand Oaks, CA (US); Scott MacDonald, Woodland Hills, CA (US); Trach Nguyen, Sylmar, CA (US)

(73) Assignee: Panavision International, L.P., Woodland Hills, CA (US)

( * ) Notice: Subject to any disclaimer, the term of this patent is extended or adjusted under 35 U.S.C. 154(b) by 0 days.

(21) Appl. No.: 15/911,245

(22) Filed: Mar. 5, 2018

(51) Int. Cl.
   *F16M 11/10* (2006.01)
   *F16M 13/04* (2006.01)
   *G03B 17/56* (2006.01)

(52) U.S. Cl.
   CPC ............ *F16M 13/04* (2013.01); *F16M 11/10* (2013.01); *G03B 17/561* (2013.01); *F16M 2200/024* (2013.01)

(58) Field of Classification Search
   CPC ..... F16M 11/10; F16M 2200/04; F16M 13/04
   USPC ........................................................ 396/420
   See application file for complete search history.

(56) References Cited

U.S. PATENT DOCUMENTS

| | | | |
|---|---|---|---|
| 5,787,317 A | 7/1998 | Robinson, Sr. | |
| 7,293,924 B2 | 11/2007 | DeSorbo et al. | |
| 7,665,698 B2* | 2/2010 | Desorbo | F16M 11/14 248/187.1 |
| 9,319,570 B2* | 4/2016 | Sparidaens | H04N 5/2251 |
| 9,519,203 B1 | 12/2016 | Kennair, Jr. | |
| 2014/0063337 A1* | 3/2014 | Sparidaens | G03B 17/563 348/376 |

* cited by examiner

*Primary Examiner* — Clayton E. LaBalle
*Assistant Examiner* — Linda B Smith
(74) *Attorney, Agent, or Firm* — Rogowski Law LLC

(57) ABSTRACT

A shoulder rest for a camera includes a main frame, a mid plate pivotably connected to the main frame and a back plate pivotably connected to the mid plate, and optionally a front plate. The pivot connections allow a user to adjust the curve of the shoulder rest. A tilt plate attached to a top surface of the main frame is configured to tilt to an angle with respect to the main frame. An adapter to which the camera is removably mounted is attached to the tilt plate, and may be moved forwardly or rearwardly with respect to the main frame, and/or may be moved toward and away from a side edge of the main frame. The tilt plate and adapter together allow the user to offset the camera away from the user's head for greater comfort.

25 Claims, 13 Drawing Sheets

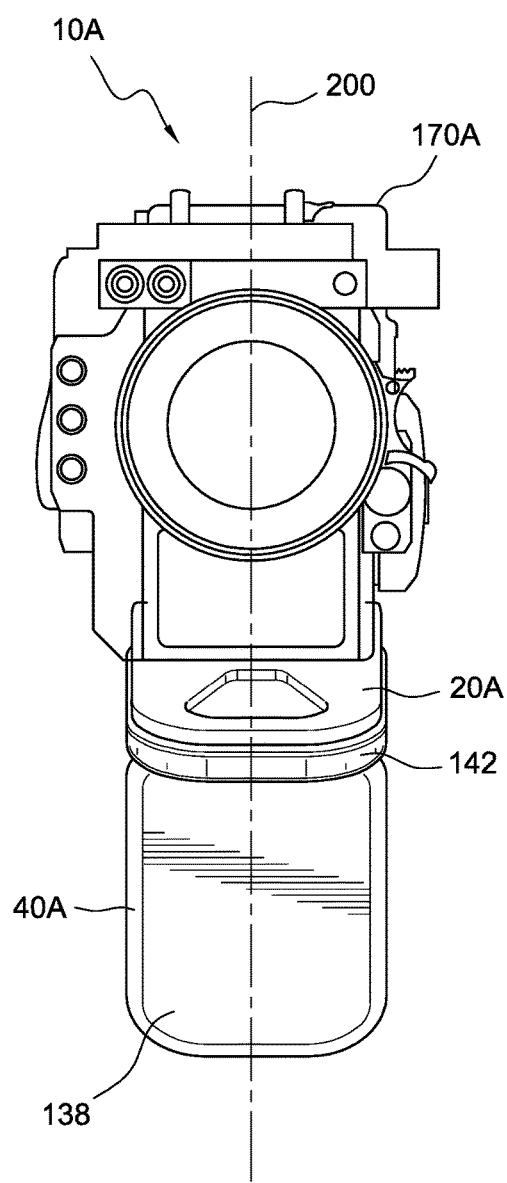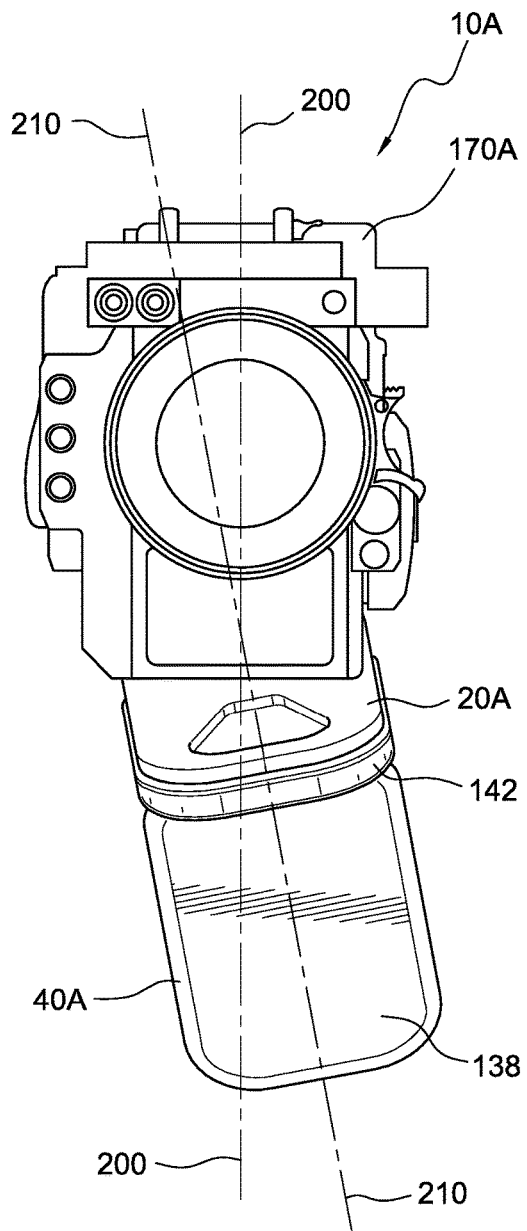
FIG. 15                   FIG. 16

ADJUSTABLE SHOULDER REST FOR CAMERA

BACKGROUND OF THE INVENTION

The present invention is generally directed to shoulder rests for cameras, in particular video, broadcast and movie cameras, that are readily adjustable to accommodate user shoulder shape and camera orientation preferences for different users without need for separate tools.

Shoulder carriers for video and movie cameras allow camera operators to bear the substantial weight of the camera on their shoulders and back. For example, U.S. Pat. No. 7,293,924 (Greene) shows a shoulder mounted support for a camera that self-balances the camera using a breast plate to support the forward weight of the camera and a battery on a back plate as a counterweight. As another example, U.S. Pat. No. 5,787,317 (Robinson, Sr.) shows a shoulder carrier that uses a shoulder harness with two U-shaped shoulder supports and a securement bar joining the shoulder supports. The camera is mounted to a platform that is connected to the shoulder harness. A belt connects the front and back regions of the shoulder supports.

The known shoulder carriers lack ability for the user to adjust the angular tilt of the camera or the spaced orientation of the camera in relation to the user's head and face. As a result, the user frequently must lean or lift the shoulder on which the shoulder carrier is held, leading to muscle fatigue and improper spinal alignment. Moreover, where the camera remains at a same tilt angle, the user frequently must tilt his or her head and neck away from the camera to compensate, also leading to muscle fatigue and improper spinal alignment.

Therefore, improvements to shoulder rests for video, broadcast and movie cameras continue to be sought.

BRIEF SUMMARY OF THE INVENTION

Briefly stated, one aspect of the present invention is directed to a shoulder rest for a camera that has a main frame with a front end and a rear end, a right side edge and a left side edge, and a top surface and a bottom surface opposite of the top surface. The top surface of the main frame defines a central axis extending from the front end to the rear end. A mid plate is joined for pivot connection to the rear end of the main frame. The mid plate has a front end and a rear end and a top surface and a bottom surface. The front end of the mid plate is joined for pivot connection to the rear end of the main frame. A back plate is joined for pivot connection to the rear end of the mid plate. The back plate has a front end and a rear end and a top surface and a bottom surface. The front end of the back plate is joined for pivot connection to the rear end of the mid plate. Together, the main frame, mid plate and back plate are configured to be positioned with their top surfaces in a common plane, or to be pivoted at the pivot connections to form a generally "J" shape or arcuate shape suitable for fitting over a user's shoulder.

The main frame may be bent at an angle, such that the front end of the main frame is angled from the back end of the main frame. Optionally, a front plate may be joined for pivot connection to the main frame. The front plate has a front end and a rear end and a top surface and a bottom surface. The rear end of the front plate is joined for pivot connection to the front end of the main frame.

The main frame, mid plate, rear plate and optional front plate may be formed of lightweight and high strength materials, such as composites or moldable polymeric materials, or metal, such as aluminum or aluminum alloys.

Cushioning elements are removably attachable to the bottom surfaces of the main frame, mid plate, rear plate and front plate. Preferably, the cushioning elements are attached using hook and loop fasteners. The cushioning elements may comprise polymeric foam or foamed rubber encased in a fabric, polymeric or leather cover. Dual density pads with softer foam over a firmer or higher density core may be used. Viscoelastic or slow recovery foams may be used. Alternatively, the cushioning elements may comprise gel pads, or gel disposed in foam. The cushioning elements may include ventilation holes or a porous outer cover.

A tilt plate is affixed to the top surface of the main frame. The tilt plate has a top surface, a bottom surface opposite from the top surface, a front end and a rear end. The tilt plate defines a longitudinal axis extending from its front end to its rear end at one side of the tilt plate, and it is configured to rotate about its longitudinal axis to cause a lateral tilt of the tilt plate. The angle of rotation or lateral tilt angle preferably is from 0 degrees to about 30 degrees, more preferably from 0 degrees to 15 degrees, or still more preferably from 0 degrees to 12 degrees. Tilt angle may be adjusted by increments of about 1 to 2 degrees each. The tilt plate may be joined for tilt rotation to the main frame by pins extending longitudinally from the tilt plate along the longitudinal axis that seat in grooves or holes in the main frame.

An adapter assembly is removably attached to the top surface of the tilt plate. The adapter assembly is configured to connect to a mounting for a camera. The main frame further defines a center longitudinal axis extending from its front end to its rear end. The adapter assembly may be configured to move relative to the tilt plate from a first position with the center axis of the adapter assembly aligned with the center axis of the main frame to a second position with the center axis of the adapter away from the center axis of the main frame and toward one side edge of the main frame.

The orientation of the camera may be adjusted in respect to the shoulder rest by tilting the tilt plate to a desired angle, and/or by sliding the tilt plate to an offset location toward one of the side edges of the shoulder rest. In this manner, a user may set a desired orientation for the camera in respect of spacing from the head and in respect of tilt angle so that the user may maintain a natural posture or stance while holding the camera to his or her body with the shoulder rest. The camera orientation thus may remain level, but the shoulder rest may be angled to conform to a desired fit by the user. The user may balance the camera without need to bend his or her neck out of the way. The user may shift the center of balance of the camera to a location to permit the user to stand more normally without arching his or her shoulder up to maintain the camera in desired position on the shoulder.

The shoulder rest preferably includes a tilt lock assembly to maintain the user's desired position for the tilt plate in respect to the main frame. The tilt lock assembly includes a retainer positioned adjacent to the tilt plate. The retainer has a surface onto which a first end of at least one compression spring is placed. Preferably, two or more compression springs are used to stabilize the tilt plate. A second end of the at least one compression spring contacts the bottom surface of the tilt plate. The at least one spring urges the tilt plate away from the retainer. The spring or springs preferably are located offset from the center of the retainer. The retainer defines a hole therethrough configured to removably receive a latch or tilt lock rack. The tilt lock rack includes a series of aligned grooves in one side. A tilt lock in the form of a tab with a wedge at its distal end contacts the tilt lock rack, with the wedge end seated in one of the grooves in the tilt lock rack. A slidable bar with a notch along its length is slidably engaged in a channel of the main frame. The slidable bar contacts the proximal end of the tilt lock and pushes the tilt lock into connection with the tilt lock rack. When the proximal end of the tilt lock is aligned with the notch, the wedge of the tilt lock may be moved out of a groove in the tilt lock rack. A push button is pushed to move the tilt lock bar to change location of the notch of the tilt lock bar.

Optionally, a safety lock may be included to secure the tilt plate to the adapter. If present, the safety lock includes a lever bar with an upstanding pin at its distal end and a lever grip at its proximal end. The lever bar seats in a channel or groove in the tilt plate, and a spring acts on the upstanding pin to urge the pin into a slot or hole to engage the tilt plate in a locked position. If the lever grip is moved to overcome the spring force and cause the pin to disengage from the slot or hole of the tilt plate, the orientation of the tilt plate may be moved.

Optionally, the tilt plate may have side walls shaped for dovetail joining to complementary shaped inner recesses of the adapter. With such construction, the adapter may be slid relative to the tilt plate from center of the main frame laterally to a location with its center axis spaced a distance from the center axis of the main frame to thereby move the lateral location of the adapter in respect of the main frame. The primary lock secures the adapter to the tilt plate in each desired location. Preferably, a safety lock or secondary lock in the tilt plate further secures the adapter to the tilt plate to preclude unintended separation of the adapter from the tilt plate.

The shoulder rest for a camera has pivot connections between the main frame and the mid plate, and between the mid plate and the back plate. When present, the front plate has a pivot connection to the main frame. Preferably, each of the pivot connections permit the plates to be adjusted at angles within a range from 0 or horizontal to about 70 degrees rotation from horizontal, or more preferably about 72 degrees rotation from horizontal.

The pivot connections each include a pivot lock assembly. Such pivot lock assembly has a spring insertable into a first chamber of a respective plate. A slidable rod has a distal end and a proximal end and defines a length between its distal end and proximal end. The slidable rod further defines a notch or recess along its length. The slidable rod is inserted into the first chamber in the respective plate. The distal end of the slidable rod is in contact with the spring. A drive block that has a distal end and a proximal end is inserted into a second chamber in the respective plate. The second chamber is oriented orthogonal or substantially orthogonal to the first chamber. The distal end of the drive block contacts the slidable rod along the rod length. The proximal end of the drive block contacts one side of a lock bar, with the opposite side of the lock bar configured to mate with one of a series of parallel grooves disposed in an arc formed in the rear end of the main frame or other plate to which the plate is pivotably joined. When the plate and the main frame or other plate to which the plate is pivotably joined are in a first angular orientation, the lock bar is mated with one of the grooves. When the plate and the main frame or other plate to which the plate is pivotably joined are in a second angular orientation, the lock bar is mated with a different one of the grooves. At least a third spring contacts the one side of the lock bar at one end and at its opposite end contacts an internal wall of the second chamber. Preferably, a pair of springs so contact one side of the lock bar and an internal wall of the second chamber, with one spring spaced apart from one side of the drive block and the other spring spaced apart from the other side of the drive block. When the distal end of the drive block contacts a portion of the length of the slidable rod other than the notch, the lock bar is retained in one of the series of grooves. When the distal end of the drive block contacts the notch of the slidable rod, the lock bar may be released from one of the series of grooves so that the respective plate may be pivoted to a different angular orientation in relation to the main frame or other plate to which it is connected.

The shoulder rest for a camera also may include a fixture removably attachable to the top surface of the back plate. The fixture is suitable for joining a camera battery or other accessory to the back plate. A camera battery or other accessory joined to the back plate acts as a counterweight to the weight of the camera held on the adapter and joined to the shoulder rest.

BRIEF DESCRIPTION OF THE DRAWINGS

The foregoing summary, as well as the following detailed description of the disclosure, will be better understood when read in conjunction with the appended drawings. For the purpose of illustrating the disclosure, there is shown in the drawings an embodiment of a headrest which is presently preferred. It should be understood, however, that the disclosure is not limited to the precise arrangements and instrumentalities shown. In the drawings:

FIG. 15 is a front elevational view of the adjustable shoulder rest for a camera with camera of FIG. 10, showing the adjustable shoulder rest in a first angular orientation; and FIG. 16 is a front elevational view of the adjustable shoulder rest for a camera with camera of FIG. 10, showing the adjustable shoulder rest in a second angular orientation.

DESCRIPTION OF THE DISCLOSURE

Figure 1:
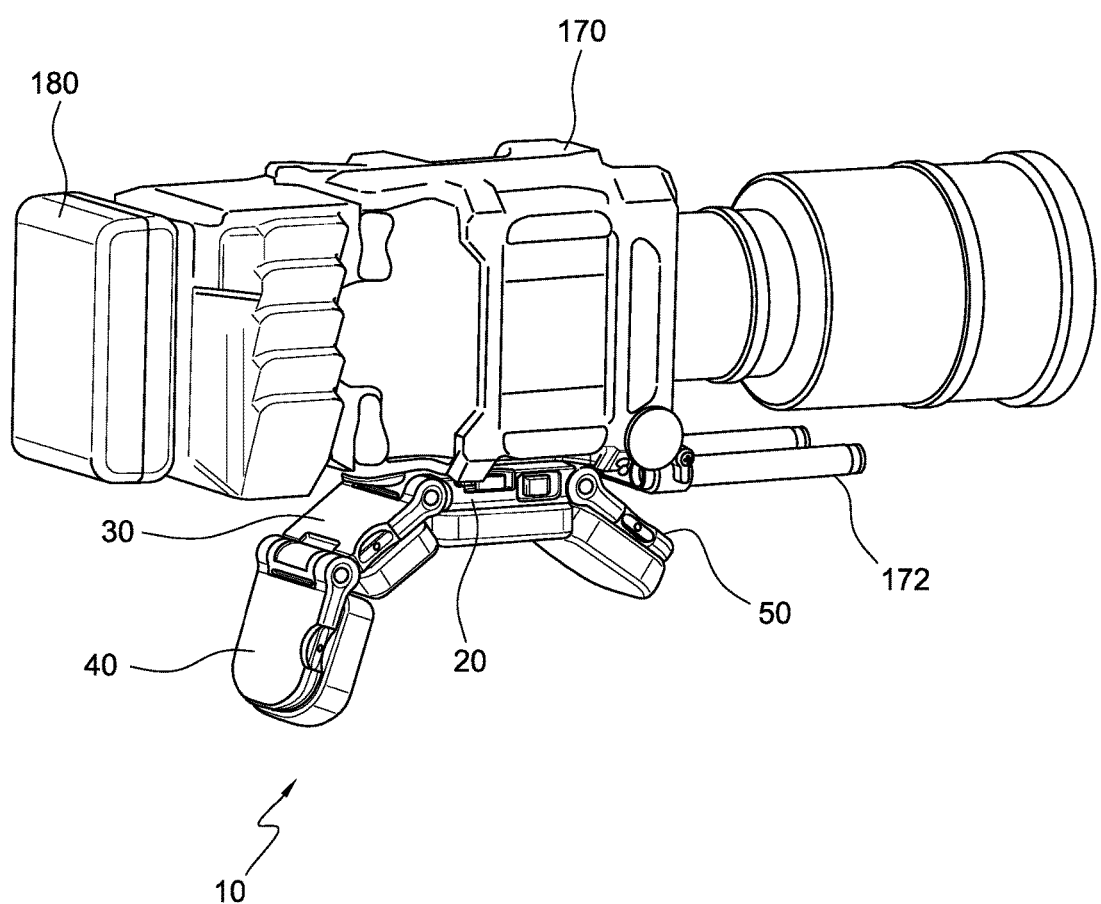
FIG. 1 is a left rear perspective view of an adjustable shoulder rest for a camera with a first adapter assembly and a camera held thereon according to a first embodiment of the invention.

Certain terminology is used in the following description for convenience only and is not limiting. The words "lower," "bottom," "upper," "top," "right" and "left" designate directions in the drawings to which reference is made. The words "inwardly," "outwardly," "upwardly" and "downwardly" refer to directions toward and away from, respectively, the geometric center of the headrest, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

It also should be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to the drawings in detail, wherein like numerals indicate like elements throughout, there is shown in FIGS. 1-9 a first embodiment of an adjustable shoulder rest 10 for a camera 170. In this embodiment, the adjustable shoulder rest 10 includes a main frame 20 that has a front end 21, a rear end 23, a top surface 22 and a bottom surface 24 opposite the top surface. The main frame 20 defines a center axis 26 extending from the front end 21 to the rear end 23.

A tilt plate 60 is joined for tilting movement to the main frame 20 in contact with a retainer 72 that is attached to the top surface 22 of the main frame 20. An adapter assembly 260, to which is attached a camera mounting or base, is in turn joined to the tilt plate 60.

Figure 2:
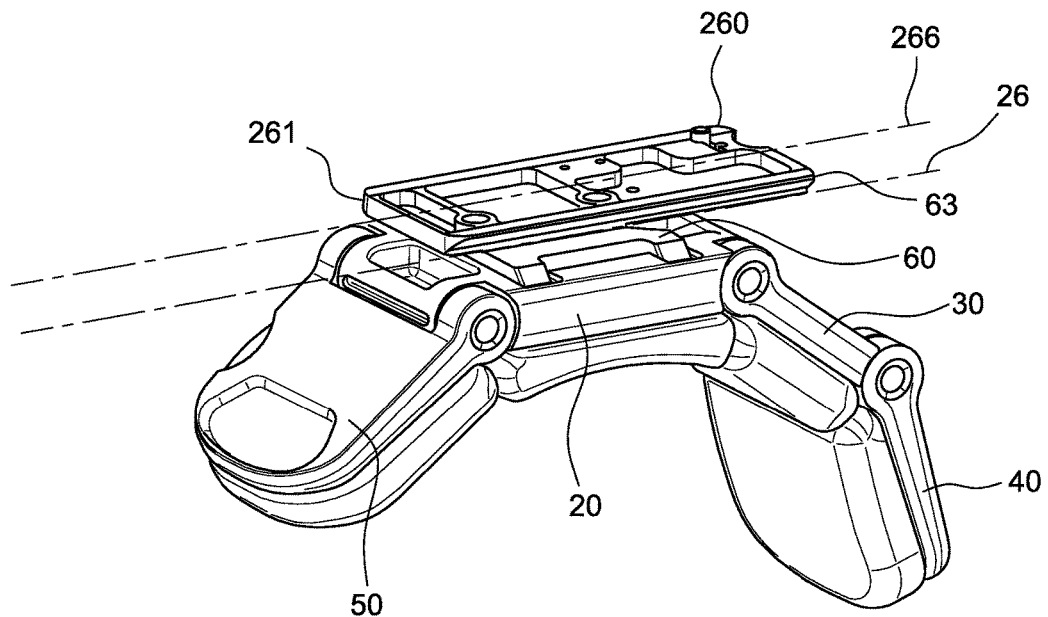
FIG. 2 is a right front perspective view of the adjustable shoulder rest of FIG. 1, showing a different adapter assembly and a tilt plate and a camera base plate mounting.
Figure 2A:
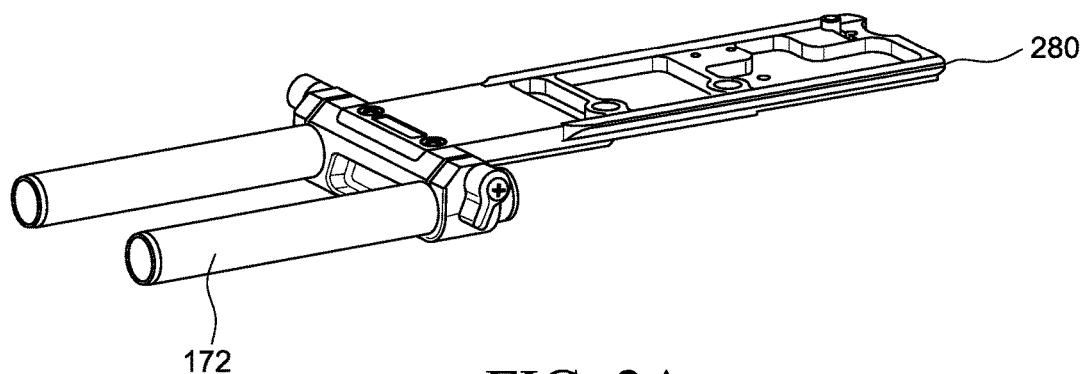
FIG. 2A is a right front perspective view of the first adapter assembly with clamp and iris rods of FIG. 1.

FIG. 2 shows two types of adapter assemblies 260 and 280, with the first type of adapter assembly 260 joined to the tilt plate 60. The alternative adapter assembly 280 includes iris rods 172 that may be attached or clamped to a front end of the adapter assembly 280 that may be grasped by a user when making tilt adjustments to the orientation of the camera 170 in respect of the shoulder rest 10.

The adjustable shoulder rest 10 further comprises a mid plate 30 and a back plate 40. In the embodiment shown in FIGS. 1-9, there is also a front plate 50. The front end 31 of the mid plate 30 is joined by pivot connection to the rear end 23 of the main frame 20. The front end 41 of the back plate 40 is joined by pivot connection to the rear end 33 of the mid plate 30. When the front plate 50 is present, the rear end 53 of the front plate 50 is joined by pivot connection to the front end 21 of the main frame 20. Together, the main frame 20, mid plate 30 and back plate 40 and front plate 50 when present are configured to be positioned as desired by a user from a flat state with their top surfaces in a common plane, or pivoted at the pivot connections to form a generally "J" shape or arcuate shape suitable for fitting over a user's shoulder.

The main frame, mid plate, rear plate and optional front plate may be formed of lightweight and high strength materials, such as composites or moldable polymeric materials or metals, such as but not limited to aluminum or aluminum alloys. A carbon filled polyamide composite sold by CRP Technology SRL under the trademark WINDFORM XT 2.0 is one example of a suitable composite material for 3-D printing manufacture of the main frame, mid plate, rear plate and front plate.

Cushions or pads 130, 134, 138, 142 are removably joined to the bottom surfaces 24, 34, 44, 54 of the main frame 20, mid plate 30, back plate 40 and front plate 50, respectively. The cushions may be polymeric foam pads, or foamed rubber or foam pads encased in a fabric or leather or polymeric cover. Hook and loop fasteners (e.g. Velcro strips) may be used to permit quick attachment and quick release of the cushions or pads to or from the main frame and plates. Dual density pads with softer foam over a firmer or higher density core may be used. Viscoelastic or slow recovery foams may be used. Alternatively, the cushioning elements may comprise gel pads, or gel disposed in foam. The cushioning elements may include ventilation holes or a porous outer cover.

Figure 6:
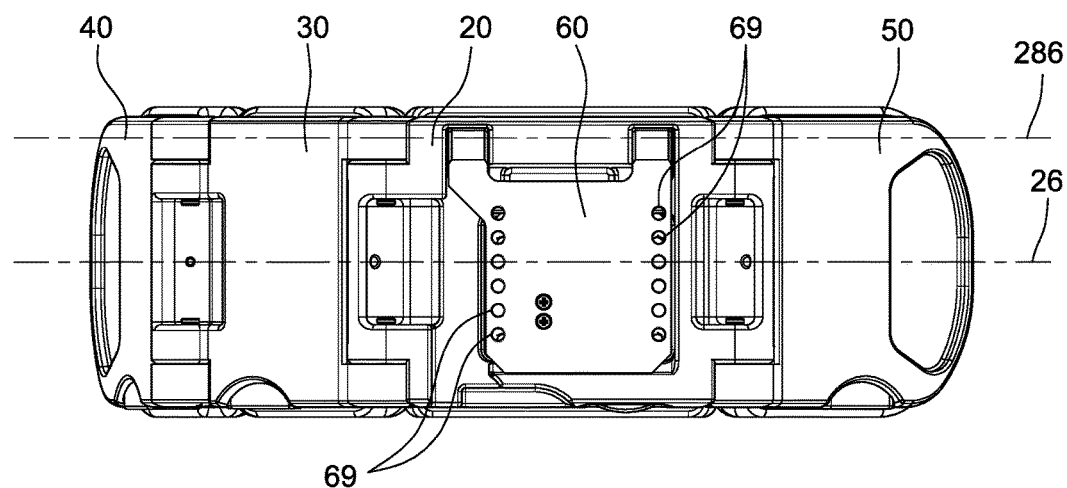
FIG. 6 a top plan view of the adjustable shoulder rest of FIG. 5.
Figure 7:
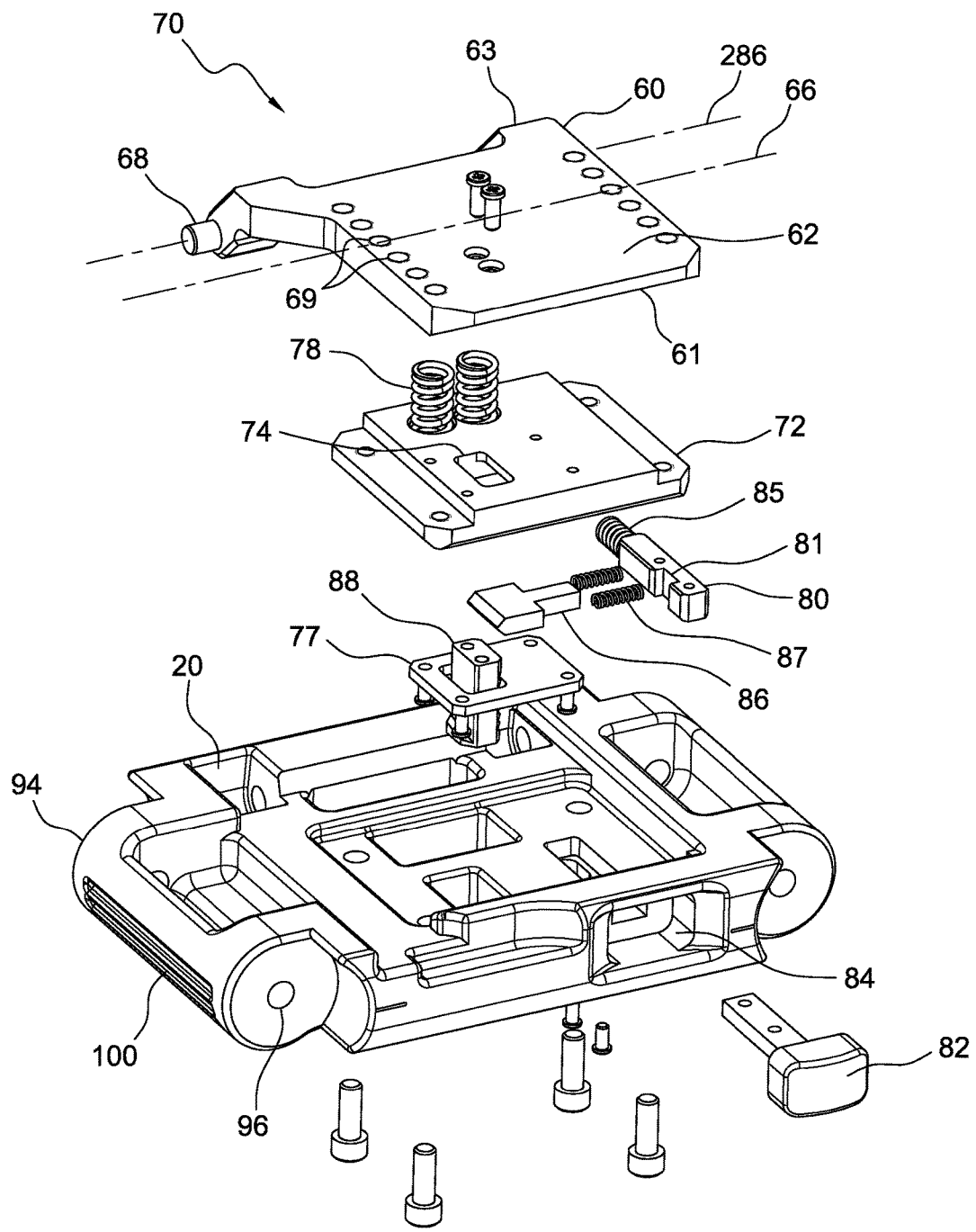
FIG. 7 is a partially exploded perspective view of the main frame of the adjustable shoulder rest of FIG. 1 showing the tilt plate with cheese plate connection holes at front and rear edges and showing the tilt lock assembly.
Figure 8:
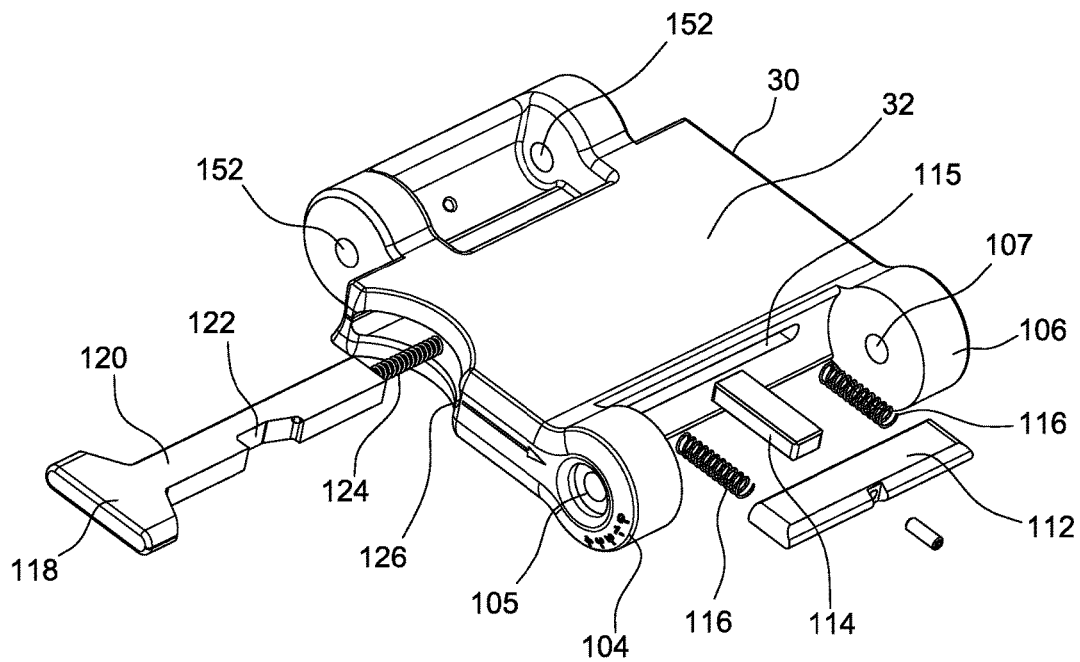
FIG. 8 is a partially exploded left front perspective view of the mid plate of the adjustable shoulder rest of FIG. 1 showing the pivot lock assembly.
Figure 8A:
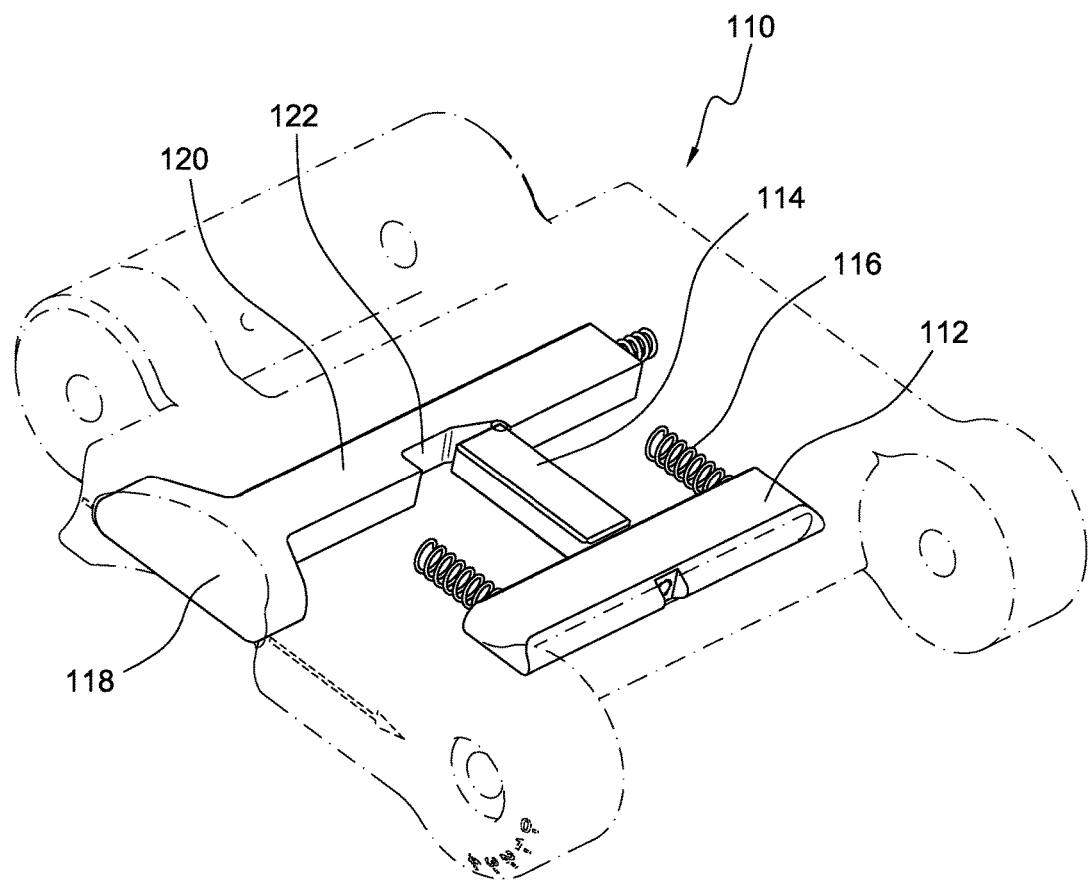
FIG. 8A is a left front perspective view of the mid plate of the adjustable shoulder rest of FIG. 1 showing the exterior in phantom outline to reveal the pivot lock assembly.
Figure 8B:
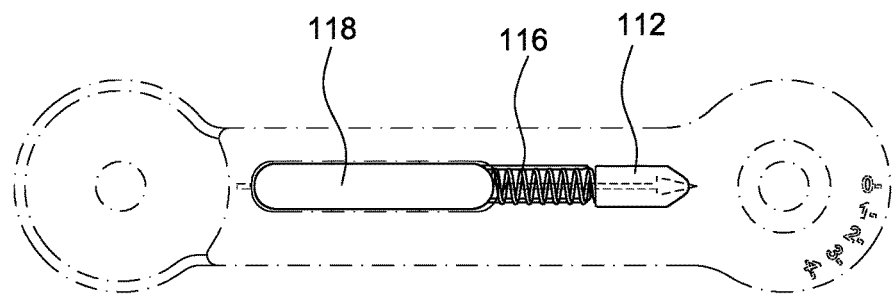
FIG. 8B is a left side elevational view in partial cross section of the mid plate of the adjustable shoulder rest of FIG. 1 showing the exterior in phantom outline to reveal the pivot lock assembly.

The embodiment shown in FIGS. 1-9 uses the same type of pivot connections between the main frame 20 and the mid plate 30, and between the mid plate 30 and rear plate 40, and between the main frame 20 and front plate 50. The pivot lock assembly 110 is shown particularly in FIGS. 8, 8A, 8B and 9. Referring to FIGS. 8, 8A and 8B, the mid plate 30 includes at its rear end two spaced apart rotary hinge ends 104, 106 defining open cores 105, 107 to align with an open core 96 of a spool 94 at the rear end 23 of the main frame 20. An axle or dowel is received within the open cores 105, 107, 96 to create the pivot hinge connection. The pivot lock assembly 110 comprises a pivot lock tab 112 that is joined to drive block 114. The drive block 114 movably fits within an axially directed channel 115 in the mid plate 30. Compression springs 116 are located to each side of the drive block 114 and also fit within the channel 115 within the mid plate 30. One end of each of the compression springs 116 contacts a bottom surface of the pivot lock tab 112 and the opposite end of each of the compression springs 116 contacts a back wall of the channel 115. The channel 115 back wall is stepped, such that the drive block 114 may move farther into the interior of the mid plate 30 than the springs 116. The springs 116 urge the pivot lock tab 112 away from the mid plate 30. Movement of the pivot lock tab 112 toward the mid plate 30 compresses the springs 116. The front end of the pivot lock tab 112 is shaped so as to seat within one of a series of parallel grooves 158 disposed in an arc around a portion of the front wall 21 of the main frame 20.

A pivot lock release button 118 extends from a proximal end of a rod 120 that is inserted into a second channel 126 formed in the mid plate 30. The second channel 126 is disposed at an angle to the first channel 115, such as at 90 degrees to the first channel 115 as shown in FIGS. 8 and 8A. A compression spring 124 contacts the distal end of the rod 120 and is inserted into the second channel 126 with the rod 120. The compression spring 124 urges the rod 120 in a direction away from the terminus of the second channel 126. The rod 120 defines a notch 122 in a location along the rod length. In a locked position for the pivot lock assembly 110, the distal end of the drive block 114 contacts a portion of the rod 120 along its rod length other than the notch 122. Upon pushing the pivot lock release button 118 to cause the rod 120 to move further into the channel 126, overcoming the force of the spring 124 that otherwise urges the rod 120 outwardly, the notch 122 is moved into alignment with first channel 115 so that the distal end of the drive block 114 may move further into the first channel 115 and seat within the notch 122. See FIG. 8A. This movement allows the pivot lock tab 112 to disengage from one of the series of parallel grooves 100 so that it may be moved to another groove in the series of parallel grooves 100 (See FIG. 7) about the portion of the front wall 21 of the main frame 20 upon rotation of the pivot hinge about the axle 156 or dowel joining the mid plate 30 and the main frame 20.

Preferably, the grooves 100 are disposed in an arc spanning from 60 to 75 degrees, more preferably an arc of about 70 to 72 degrees. As such, the pivotable hinges between the main frame and the mid plate, between the main frame and the front plate, and between the mid plate and the back plate are configured to allow the adjustable shoulder rest 10 to be manipulated from a horizontal configuration, to desired bent positions to fit over a user's shoulder. The pivotable hinges preferably have range of motion from zero degrees, or horizontal, to about 75 degrees from horizontal, most preferably 72 degrees from horizontal. Preferably, each of the pivot connections permit the plates to be adjusted at angles within a range from 0 or horizontal to about 70 degrees rotation from horizontal, or more preferably about 72 degrees rotation from horizontal.

Figure 9:
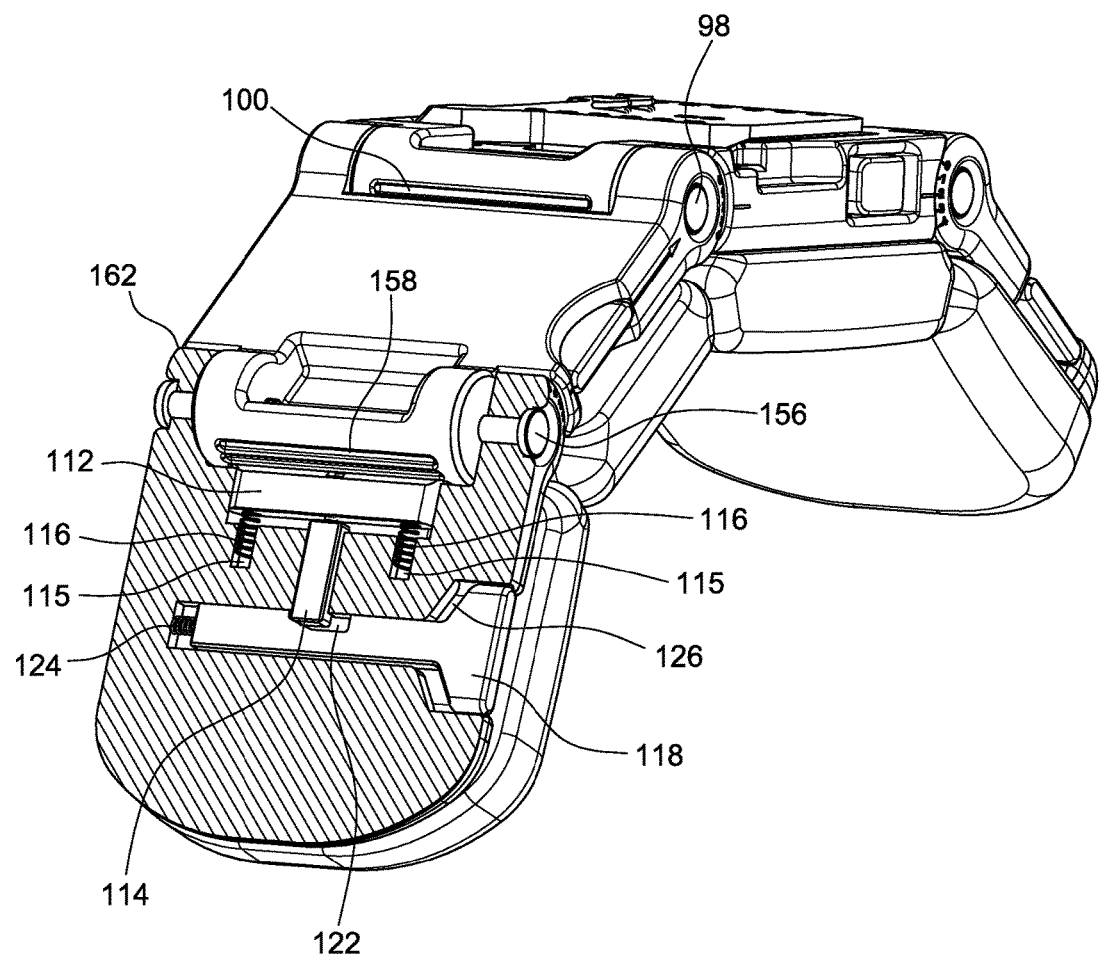
FIG. 9 is a partial cross section of the back plate of the adjustable shoulder rest of FIG. 1 showing the pivot lock assembly.

A same or similar pivot lock assembly 110 may join the front end 41 of the back plate 40 to the rear end 33 of the mid plate 30. Referring to FIG. 9, a cross section of the back plate 40 shows a series of parallel grooves 158 about a curved portion of the rear end 33 of the mid plate 30. Preferably, the grooves 159 are disposed in an arc spanning from 60 to 75 degrees, more preferably an arc of about 70 to 72 degrees. The left hinge end 162 and right hinge end 164 of the back plate 40 engage on opposite sides of the spool end 152 of the mid plate 30. Each of the left hinge end 162, right hinge end 164 and spool end 152 define central open cores 163, 165, 154 configured to receive an axle or dowel 156 to join the hinge ends to the spool end 152 for common rotation about the axle or dowel 156. The pivot lock assembly 110 includes a pivot lock tab 112 joined to a drive block 114 with compression springs 116 to urge the pivot lock tab 112 into one of the series of grooves 158 in the mid plate 30. The drive block 114 is movably inserted into a channel in the back plate 40. The channel is stepped, and the back wall of the channel where the compression springs are received is to a lesser depth than the channel into which the drive block 114 is received. The distal end of the drive block 114 contacts a rod 120 of the pivot lock release button 118. The rod 120 defines a notch 122 along its length. The rod 120, along with a compression spring 124, are inserted into a channel in the back plate 40 disposed at an angle to the channel that receives the drive block 114. When the button 118 is pushed to urge the distal end of the rod 120 against compression spring 124, the rod 120 is moved farther into the channel, causing the distal end of the drive block 114 to be received in the notch 122. Such movement is sufficient to overcome the spring force of compression springs 116 so that the pivot lock tab 112 may disengage from a respective groove 158 so that the hinge connection may be rotated to a different angular orientation between the mid plate 30 and the back plate 40.

Figure 7A:
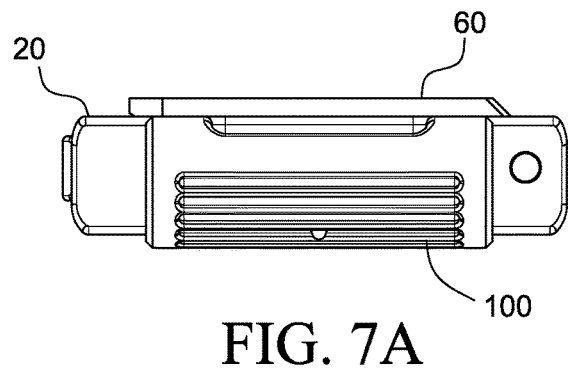
FIG. 7A is a front elevational view of the main frame of the adjustable shoulder rest of FIG. 2 with the tilt plate at 0 degrees lateral tilt angle.
Figure 7B:
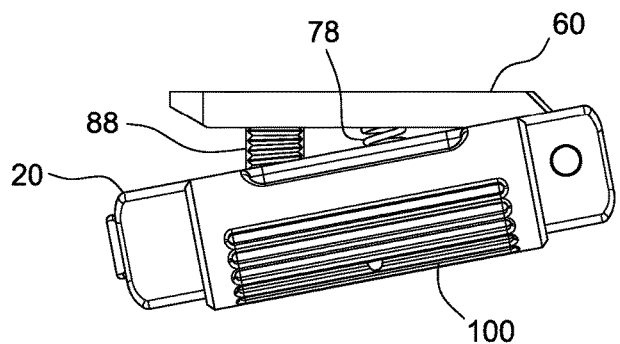
FIG. 7B is a front elevational view of the main frame of the adjustable shoulder rest of FIG. 2 with the tilt plate at about 12 degrees lateral tilt angle.

Referring next to FIGS. 7, 7A and 7B, the tilt mechanism is shown in association with the main frame 20 or center plate. The tilt mechanism comprises a first variant of a tilt plate 60, a retainer 72 and a tilt lock assembly 70. An adapter assembly 260 or 280 (not shown in FIG. 7) to which a camera mount plate or base is mounted, is in turn mounted to the tilt plate 60. The tilt plate 60 has a front end 61 and a rear end 63 opposite from the front end 61. The tilt plate has a central axis 66 (FIG. 7) and a longitudinal tilt axis 286.

For the tilt mechanism, the retainer 72 is joined to the top surface 22 of the main frame 20. Compression springs 78 are joined at one end to the top surface of the retainer 72 and contact the bottom surface 64 of the tilt plate 60. The compression springs 78 urge the tilt plate 60 away from the retainer 72 to preload the shoulder rest against a user's shoulder when tilt is adjusted. The tilt plate 60 has a longitudinal tilt axis 286 along one side edge at which is located a dowel pin 68 or pins extending in a longitudinal direction at the one side edge. The ends of the dowel pin 68 or pins engage holes in the main frame 20 to join the tilt plate to the main frame 20, but still permit rotational or tilting movement of the tilt plate 60 about the tilt axis 286 at the dowel pin 68 or pins. The tilt plate 60 may be tilted to an angle from horizontal in respect of the top surface 22 of the main frame 20. The compression springs 78 are compressed when the tilt plate 60 is in horizontal or substantially horizontal orientation, parallel or substantially parallel to the top surface 22 of the main frame 20. The compression springs 78 also help to stabilize the tilt plate 60 against excessive movement when the tilt plate position is adjusted.

The tilt lock assembly 70 maintains the desired tilt angle for the tilt plate 60 that is set by the user. The tilt lock assembly 70 includes the retainer 72. The retainer 72 defines a hole 74 through which is interposed a latch or tilt lock rack 76. The latch 76 is installed through a latch plate 77 with one end insertable into the hole 74 through retainer 72. The tilt lock rack 76 includes a series of grooves 88 in a sidewall thereof.

A tilt lock slidable bar 80 is inserted into a channel 84 in the main frame 20 that is at an angle to the center axis of the main frame. The tilt lock slidable bar 80 defines a notch 81 along its length. A button 82 is installed on the proximal end of the tilt lock slidable bar 80. A compression spring 85 acts on the distal end of the tilt lock slidable bar 80. Pushing the button 82 moves the slidable bar 80 further into the channel 84 and compresses the spring 85. The proximal end of a tilt lock 86 contacts a portion of the length of the slidable bar 80. When the proximal end of the tilt lock 86 contacts an unnotched portion of the length of the slidable bar 80, the compression springs 87 are compressed. When the proximal end of the tilt lock 86 seats in the notch 81, the distal end of the tilt lock 86 may be separated from one of the receiving grooves 88 in the tilt lock rack 76. The tilt plate 60 then may be rotated by dowel 68 to a different tilt angle in respect of the top surface of the main frame 20. The springs 87 urge the tilt lock 86 away from the slidable bar 80, such that the user may feel when the distal end of the tilt lock 86 is seated into one of the grooves 88 of the tilt lock rack 76.

Referring to FIGS. 7A and 7B, different positions of the tilt plate 60 in respect of the main frame 20 are shown. The angle of rotation or lateral tilt angle preferably is from 0 degrees to about 30 degrees, more preferably from 0 degrees to 15 degrees, or still more preferably from 0 degrees to 12 degrees. Tilt angle may be adjusted by increments of about 1 to 2 degrees each.

Figure 4:
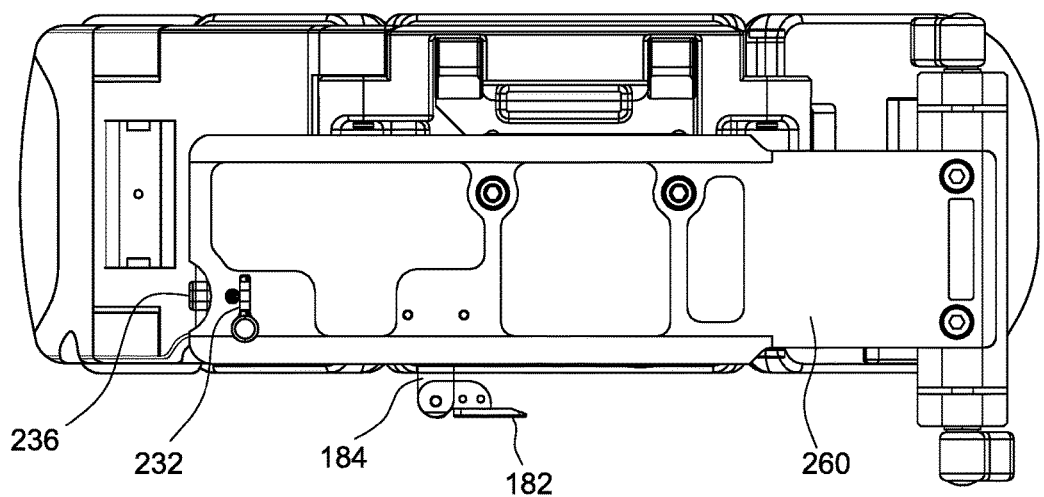
FIG. 4 is a top plan view of the adjustable shoulder rest of FIG. 1, showing a first orientation of the adapter assembly.
Figure 3:
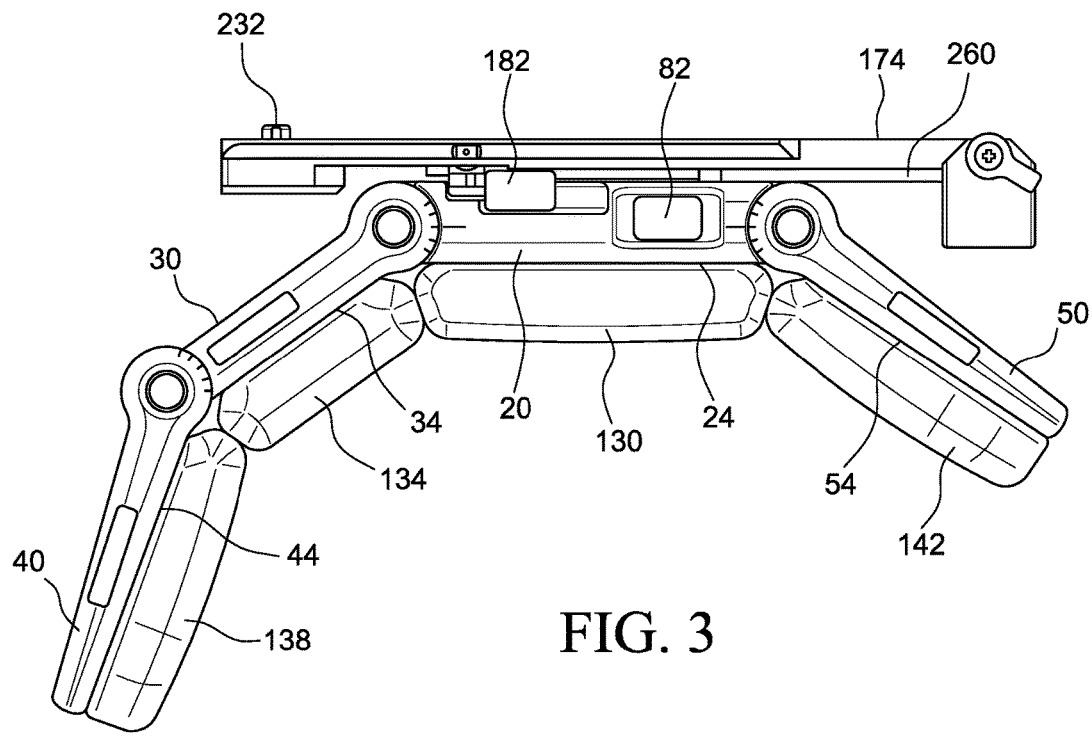
FIG. 3 is a left side elevational view of the adjustable shoulder rest of FIG. 1.
Figure 5:
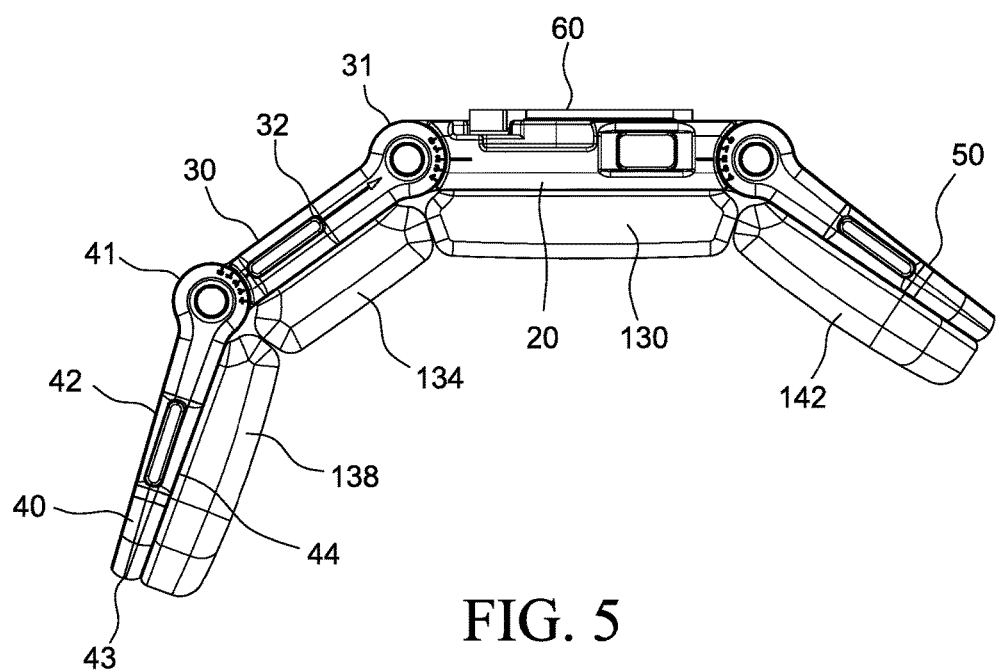
FIG. 5 is a left side elevational view of the adjustable shoulder rest of FIG. 1, with the adapter assembly removed and showing the tilt plate in untilted position.

In addition, the adapter assembly 260 to which the camera is mounted may be moved forwardly or rearwardly in respect of the tilt plate 60 and the main frame 20, or laterally (e.g., side to side) in respect of the tilt plate 60 and the main frame 20. Referring to FIGS. 5 and 6, the adapter assembly 260 is removed to reveal the tilt plate 60. The tilt plate 60 of this embodiment has a series of holes 69 therethrough near its side edges configured to receive fasteners (not shown) for cheese plate connection of the adapter assembly 260 (or 280) to the tilt plate 60. As shown in FIGS. 3 and 4, the adapter assembly 260 is shown in a first orientation generally centrally balanced over the top surface of the main frame 20. The adapter assembly 260 may be moved to a different location and reattached to the tilt plate 60 by the cheese plate connection.

A safety lock pin 232 maintains connection between the adapter assembly 260 and the tilt plate 60. A button 236 is activated or pulled to retract the safety lock pin 232 from its fit in a cavity or recess of the adapter assembly 260 to permit movement of the adapter assembly 260 with relation to the tilt plate 60. See FIGS. 3 and 4.

The camera 170 may be moved from front to back by dovetail connection to the adapter assembly 260. A thumb tab 182 may be released to cause latch 184 to release from latch hold on the adapter assembly 260 so that the camera may move along guides on the top surface of the adapter assembly 260.

With the combination of tilting adjustment and location adjustment of the camera 170 in respect to the main frame 20 of the shoulder rest 10, the user may adjust the shoulder rest to a desired configuration to permit the user to maintain a normal standing posture while retaining the shoulder rest and camera on his or her shoulder for a shoot. The tilt plate 60 permits tilting the adapter assembly 260 (or 280) to which the camera 170 is mounted in relation to the main frame 20 so that the user can comfortably retain the shoulder rest 10 with camera 170 on their shoulder in a normal standing posture without need to lean, to tilt their head or to lift up their shoulder. The adapter assembly 260 (or 280) may be adjusted laterally (side to side in respect of the tilt plate) by the cheese plate connection to the tilt plate. In addition, the adapter assembly 260 permits forward to backward movement of the camera in relation to the main frame 20 so that the user can comfortably balance the weight of the camera 170 on the shoulder rest 10 while remaining in a normal standing posture without leaning forward or backward for balance.

Referring next to FIGS. 10-16, a second embodiment of an adjustable shoulder rest 10A for a camera 170A is shown. In these figures, like reference numerals refer to like components of the structure of the embodiment of FIGS. 1-9. Different from the first embodiment, the second embodiment of the adjustable shoulder rest 10A includes a main frame 20A with a bent front wall forming the front panel of the shoulder rest. In this configuration, the front panel is set at one angular orientation and is not adjustable.

The mid plate 30 is of a same construction as the first embodiment.

The back plate 40A is of a similar construction to the back plate shown in the first embodiment, except that the top surface of the back plate 40A includes a structure to receive an engagement fixture 178, to which in turn is connected a battery unit 180.

Figure 10:
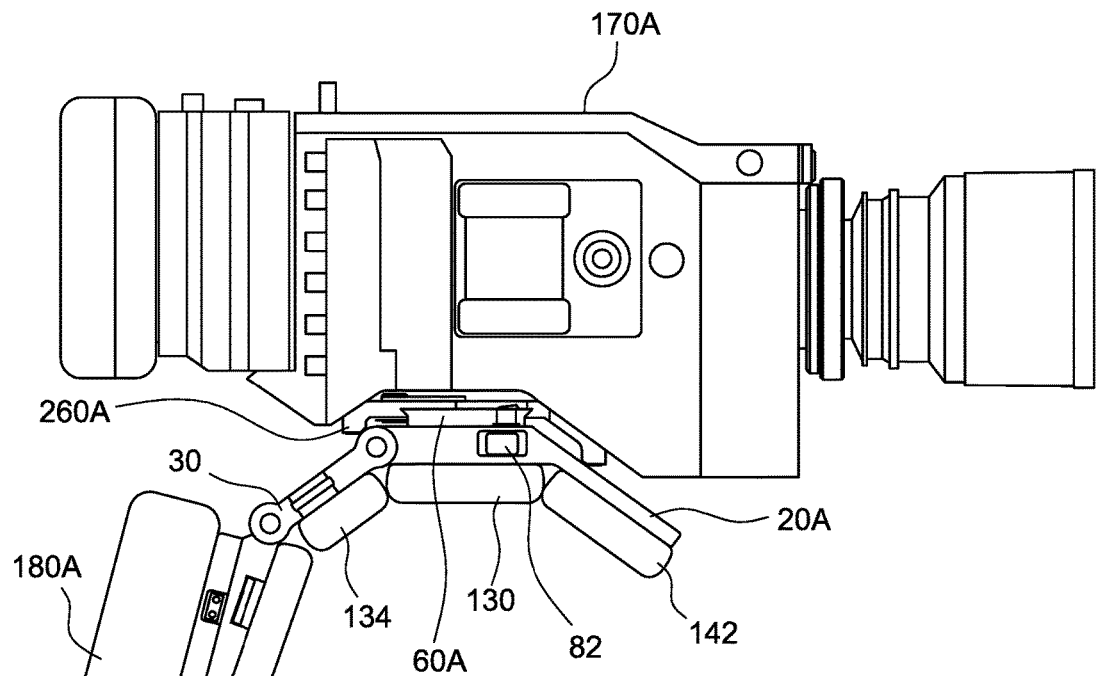
FIG. 10 is a left side elevational view of an adjustable shoulder rest for a camera with a camera held thereon according to a second embodiment of the invention.

Cushions 130, 134, 138, 142 are attached to the bottom surfaces of the main frame 20A, mid plate 30 and back plate 40A of the second embodiment. As shown in FIG. 10, the bottom surfaces of the main frame 20A receive two cushions 130, 142. Cushions preferably are removably attachable, such as with hook and look fasteners (e.g., Velcro). The cushions may be polymeric foam pads, or foamed rubber or foam pads encased in a fabric or leather or polymeric cover. Hook and loop fasteners (e.g. Velcro strips) may be used to permit quick attachment and quick release of the cushions or pads to or from the main frame and plates. Dual density pads with softer foam over a firmer or higher density core may be used. Viscoelastic or slow recovery foams may be used. Alternatively, the cushioning elements may comprise gel pads, or gel disposed in foam. The cushioning elements may include ventilation holes or a porous outer cover.

Figure 11:
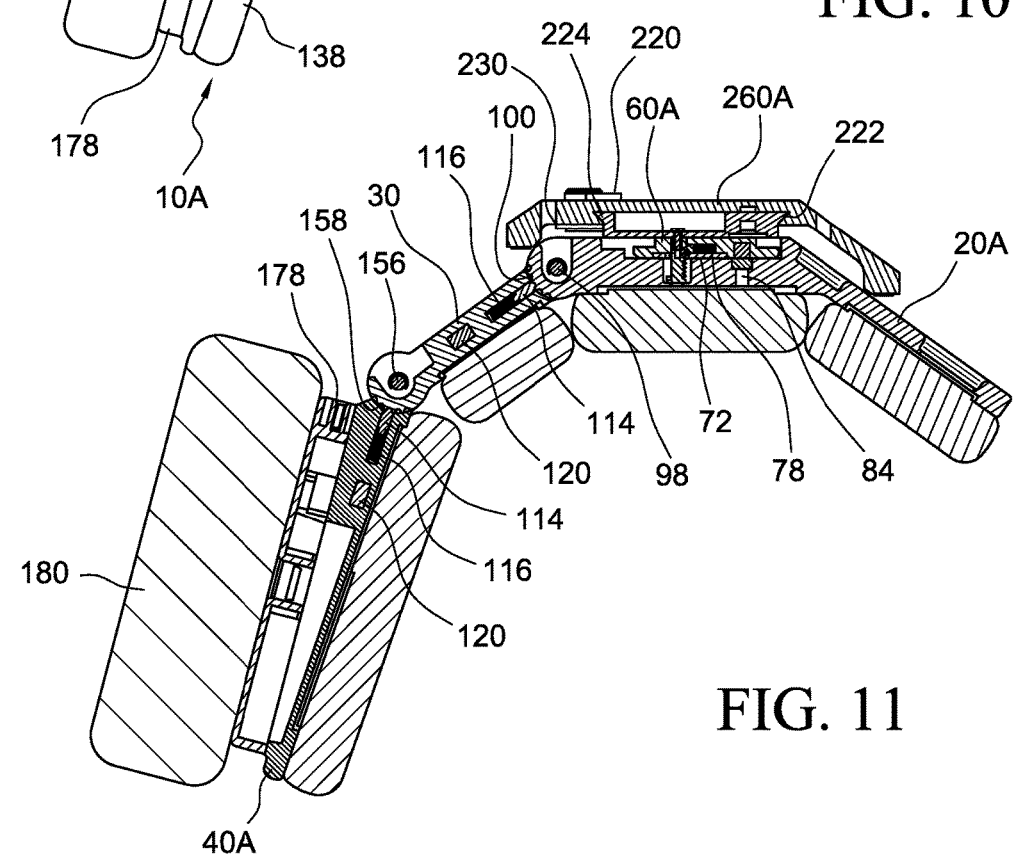
FIG. 11 is a left side elevation cross-sectional view of the adjustable shoulder rest of FIG. 10 without the camera held thereon.
Figure 12:
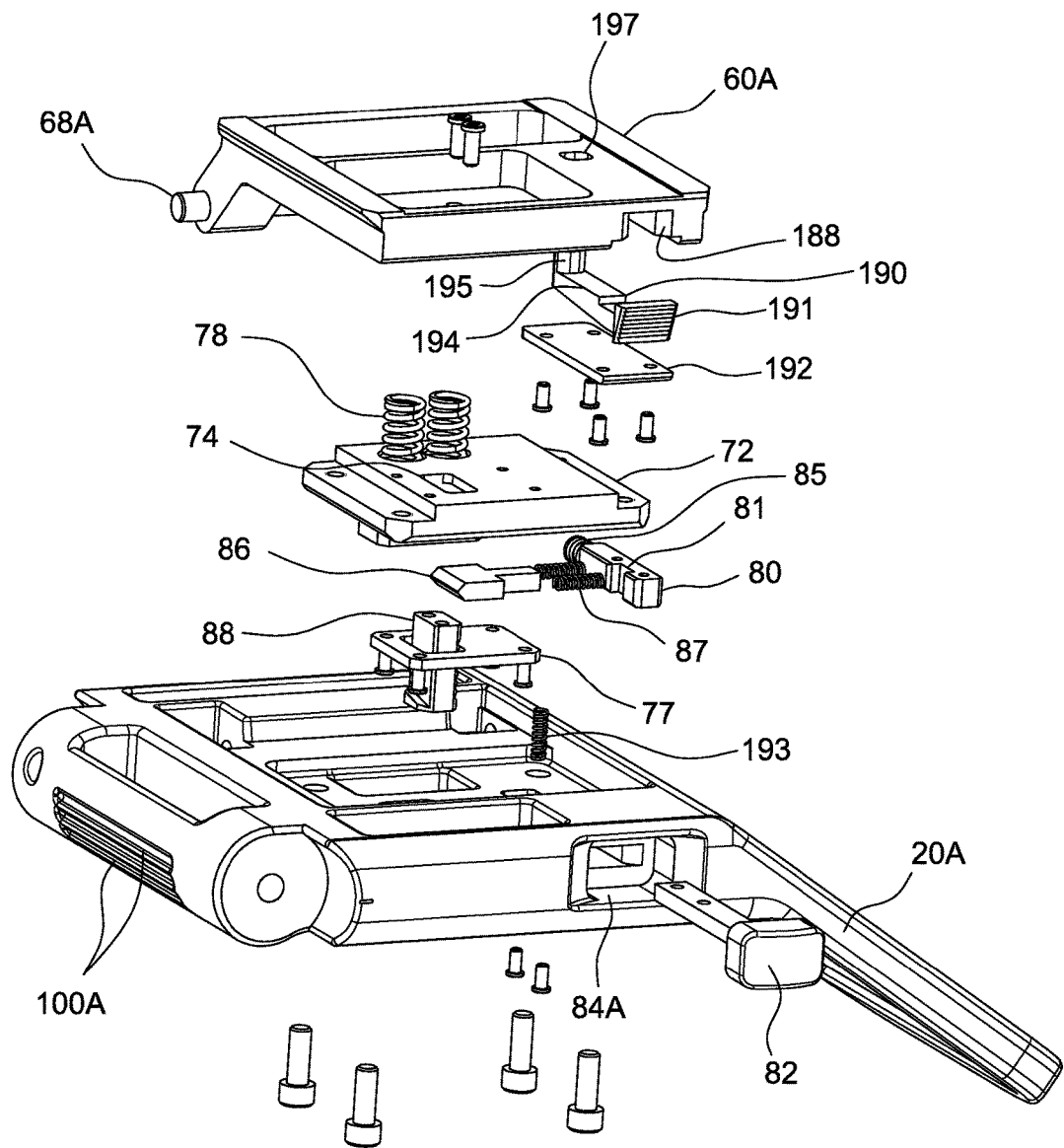
FIG. 12 is a left side partially exploded view of a main frame of the adjustable shoulder rest of FIG. 10 showing the alternative tilt plate and tilt lock assembly.
Figure 13:
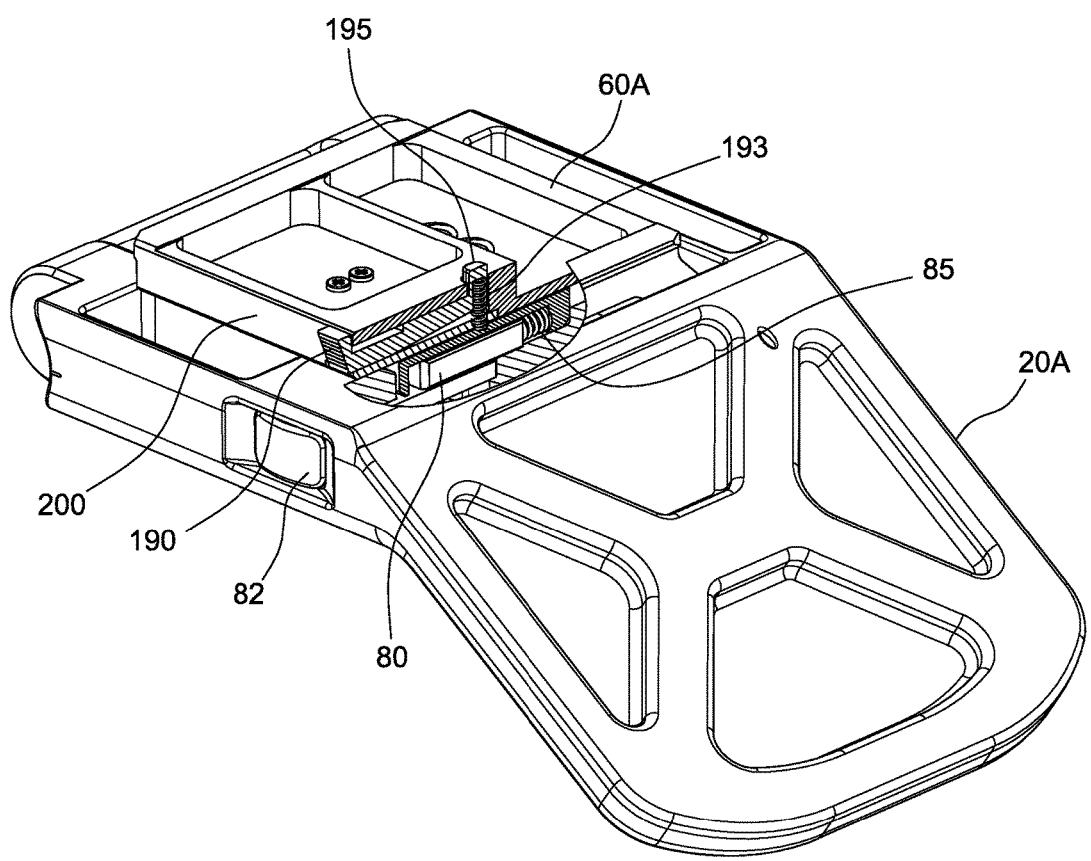
FIG. 13 is a left side partially cut away perspective view of the main frame of the adjustable shoulder rest of FIG. 10 showing the safety locking mechanism against lateral movement of the adapter assembly with relation to the tilt plate.
Figure 14:
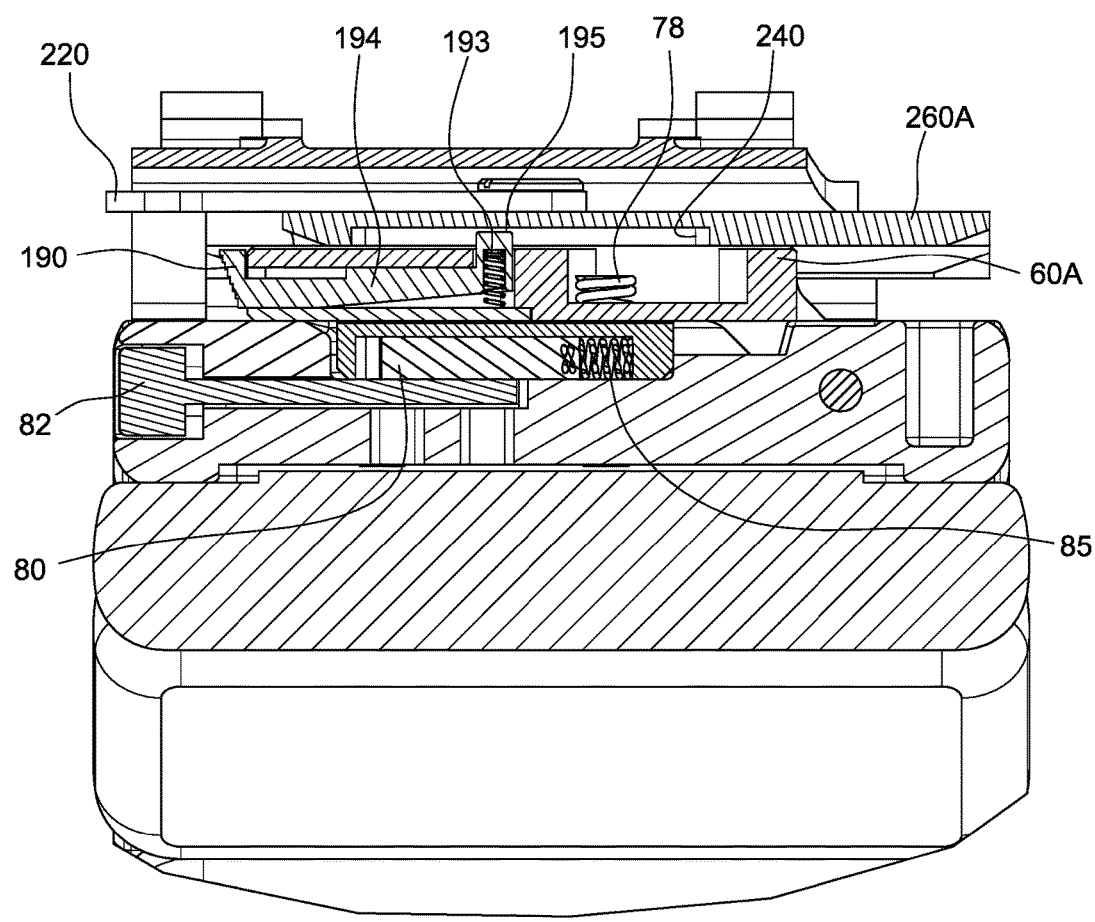
FIG. 14 is a front cross-sectional view of the main frame of the adjustable shoulder rest of FIG. 10 showing the safety locking mechanism for the adapter assembly and tilt lock for the tilt plate.

The tilt lock assembly 70A shown particularly in FIGS. 11 to 13 includes a tilt plate 60A and an adapter assembly 260A to which a camera mount plate and camera 170A may be secured. The tilt plate 60A and adapter assembly 260A of this embodiment are tiltable to permit a changed angle of tilt for the camera 170A in relation to the top surface of the main frame 20A. However, in this embodiment, the tilt plate 60A and adapter assembly 260A are not adjustable for movement forward and rearward in relation to the main frame 20A, although the adapter assembly 260A may be moved laterally (from side to side) as explained in more detail below. Extra weight to balance the camera on the user's shoulder is provided by securing the battery 180 to a fixture 178 attached to the top surface of the back plate 40A.

As shown in FIG. 12, the tilt lock assembly 70A includes a retainer 72 that is fixed to a top surface of the main frame 20A. The tilt plate 60A in joined for tiltable movement to the main frame 20A with dowel 68A or pins. The ends of the dowel 68A seat in holes in the main frame 20A so that the tilt plate 60A may be rotated about the longitudinal axis established by the dowel 68A. A tilt lock rack 76 with notches 88 on one side is inserted into a hole 74 in retainer 72. A lock bar 80 within a channel 84A of the main frame 20A has its distal end in contact with a compression spring 85. The lock bar 80 defines a notch 81 in a portion of its length. The lock bar 80 acts on tilt lock 86. The distal end of the tilt lock 86 seats in one of the notches or grooves 88 in the lock rack 76. The proximal end of the tilt lock 86 contacts the side of the lock bar 80. When the proximal end of the tilt lock 86 is in contact with notch 81, the distal end of the tilt lock 86 may be separated from one of the notches or grooves 88 so as to be moved for connection with another of the notches or grooves by tilting the tilt plate 60A.

The tilt plate 60A further includes dovetail connection 222, 224 to the adapter assembly 260A so that the adapter assembly 260A may be slid in a direction toward or away from the right side edge front of the main frame 20A in respect to the tilt plate 60A. In the embodiment shown in FIG. 11, the male dovetail connections 222, 224 of the tilt plate 60A slidably engage the female dovetail connections formed in an underside of the adapter assembly 260A. The adapter assembly 260 thus may be slid toward or away from a side edge of the main frame 20A while still connected to the tilt plate 60A. A primary dovetail lock 230 wedges to the dovetail connection between the adapter assembly 260 and the tilt plate 60A to prevent sliding movement when engaged. The primary dovetail lock 230 is moved into and out of engagement by lever 220 associated with the adapter assembly 260. See FIGS. 11 and 14.

A safety lock 190 also may be installed with the tilt lock assembly 70A to maintain the adapter assembly 260A in connection with the tilt plate 60A. The safety lock 190 precludes unintended separation of the adapter assembly 260 from the tilt plate 60A. The safety lock 190 comprises a wedge-shaped rod defining a length and having an upwardly projecting pin 195 at its distal end. The pin 195 is driven upwards by spring 193, so that it seats in a mating opening 197 in tilt plate 60A and in a retaining slot 240 in adapter assembly 260. The opening 197 is a through hole. The safety lock 190 is fit within a channel or groove 188 formed in the tilt plate 60A, and is retained therein by a retainer 192 secured to the retainer 72. A user may lift the button or tab 191 of the safety lock 190 to counter the spring 193 so that the pin 195 separates from the groove or recess 240 in the adapter assembly 260A to disengage the safety lock 190 and adjust the side to side movement of the adapter assembly 260A in respect to the tilt plate 60A.

As shown in FIGS. 15 and 16, the orientation of the camera 170A in relation to the shoulder rest 10A may be adjusted by tilting. In FIG. 15, the camera 170A is centrally aligned with the center axis 200 of the shoulder rest 10A. In FIG. 16, the tilt plate 60 has been tilted to in turn tilt the adapter assembly 260A and camera 170A to an angle in respect of the top surface of the main frame 20A. As a result, the tilt axis 210 is at an angle to the center axis 200 of the shoulder rest 10A. Adjusting the tilt angle to a desired position enables the user to accommodate the adjustable shoulder rest 10A on his or her shoulder while remaining in a natural stance position without tilting his or her head or arching his or her back or shoulder to maintain the camera in a desired position for the shoot. The user does not need to change his or her posture to maintain the camera in desired balance on his or her shoulder using the shoulder rest 10A.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

We claim:

1. A shoulder rest for a camera, comprising:
    a main frame having a front end and a rear end, a right side edge and a left side edge, and a top surface and a bottom surface opposite the top surface, said top surface of said main frame defining a central axis extending from the front end to the rear end;
    a mid plate having a front end and a rear end and a top surface and a bottom surface, with its front end joined for pivot connection to the rear end of the main frame;
    a back plate having a front end and a rear end and a top surface and a bottom surface, with its front end joined for pivot connection to the rear end of the mid plate;
    a tilt plate attached for tilting movement to the top surface of the main frame, said tilt plate having a top surface, a bottom surface opposite from the top surface, a front end and a rear end, said tilt plate defining a longitudinal axis extending from its front end to its rear end at one side of the tilt plate, said tilt plate configured to rotate about its longitudinal axis; and
    an adapter assembly attached to the top surface of the tilt plate, said adapter assembly configured to connect to a mounting for the camera.

2. The shoulder rest for a camera of claim 1, wherein the adapter assembly is further configured to move toward and away from the right side edge of the main frame.

3. The shoulder rest for a camera of claim 1, wherein the adapter assembly is further configured to move toward and away from the rear end of the main frame.

4. The shoulder rest for a camera of claim 1, further comprising:
    a front plate having a front end and a rear end and a top surface and a bottom surface, with its rear end joined for pivot connection to the front end of the main frame.

5. The shoulder rest for a camera of claim 1, further comprising:
    cushioning elements removably attached to the bottom surfaces of the main frame, the mid plate and the back plate.

6. The shoulder rest for a camera of claim 1, further comprising:
    a tilt lock assembly comprising a retainer positioned adjacent to the tilt plate, said retainer having a surface onto which a first end of at least one compression spring is placed, with a second end of the at least one compression spring contacting the bottom surface of the tilt plate, said retainer defining a hole therethrough configured to removably receive a tilt lock rack defining two or more grooves in a sidewall thereof, a tilt lock have a proximal end and a distal end, with its distal end in contact with the tilt lock rack, and a slidable bar having a proximal end and a distal end and defining a notch along its length, with a portion of the length of said slidable bar in contact with the proximal end of the tilt lock and actuatable to urge the distal end of the tilt lock into one of the two or more grooves of the tilt lock rack.

7. The shoulder rest for a camera of claim 1, wherein the tilt plate has a range of tilting movement from 0 degrees to about 30 degrees.

8. The shoulder rest of claim 1, further comprising a primary lock to secure the adapter assembly to the tilt plate.

9. The shoulder rest for a camera of claim 1, further comprising:
    a first pivot lock assembly comprising a second spring insertable into a first chamber in said mid plate, a slidable rod having a distal end and a proximal end and defining a length between the distal end and proximal end, said slidable rod defining a notch or recess along its length, said slidable rod insertable into the first chamber in said mid plate with its distal end in contact with said second spring, a drive block having a distal end and a proximal end, said drive block insertable into a second chamber in said mid plate that is oriented orthogonal or substantially orthogonal to the first chamber, with the distal end of said drive block contacting said slidable rod along the length of the slidable rod between the distal end and the proximal end, and the proximal end of said drive block contacting one side of a lock bar, with the opposite side of said lock bar configured to mate with one of a series of parallel grooves disposed in an arc formed in the rear end of the main frame when said mid plate and said main frame are in a first angular orientation and with one other of the series of grooves when said mid plate and said main frame are in a second angular orientation, and at least a third spring contacting the one side of the lock bar at one end and at its opposite end contacting an internal wall of the second chamber, wherein the distal end of the drive block contacts a portion of the length of the slidable rod other than the notch to retain the lock bar in one of the series of grooves, and wherein the distal end of the drive block contacts the notch of the slidable rod to release the lock bar from one of the series of grooves so that the mid plate may be pivoted to a different angular orientation in relation to the main frame.

10. The shoulder rest for a camera of claim 1, wherein the pivot connection between the main frame and the mid plate spans from a position where the top surface of the main frame and the top surface of the mid plate are disposed in a same horizontal plane to a position where the top surface of the main frame and the top surface of the mid plate are disposed at an angle of about 70 degrees.

11. The shoulder rest for a camera of claim 1, wherein the pivot connection between the mid plate and the back plate spans from a position where the top surface of the mid plate and the top surface of the back plate are disposed in a same horizontal plane to a position where the top surface of the mid plate and the top surface of the back plate are disposed at an angle of about 70 degrees.

12. The shoulder rest for a camera of claim 1, wherein the tilt plate has a right side edge and a left side edge, with each edge shaped as male dovetail connection adapted to mate with female dovetail connections of the adapter assembly.

13. The shoulder rest for a camera of claim 1, wherein the tilt plate defines a plurality of holes in its top surface for cheese plate connection to the adapter assembly.

14. The shoulder rest for a camera of claim 1, wherein the top surface of the main frame has a first portion and a second portion, wherein the first portion is disposed at an angle to the second portion.

15. The shoulder rest for a camera of claim 1, further comprising a fixture removably attachable to the top surface of the back plate.

16. The shoulder rest for a camera of claim 5, further comprising:
a cushioning element removably attached to the bottom surface of the front plate.

17. The shoulder rest for a camera of claim 5, wherein the cushioning elements are attached with hook and loop fasteners.

18. The shoulder rest for a camera of claim 6, wherein another compression spring contacts the distal end of the slidable bar to oppose axial movement of the slidable bar.

19. The shoulder rest for a camera of claim 9, further comprising:
a second pivot lock assembly comprising a third spring insertable into a first chamber in said back plate, a second slidable rod having a distal end and a proximal end and defining a length between the distal end and proximal end, said second slidable rod defining a notch or recess along its length, said second slidable rod insertable into the first chamber in said back plate with its distal end in contact with said third spring, a second drive block having a distal end and a proximal end, said second drive block insertable into a second chamber in said back plate that is oriented orthogonal or substantially orthogonal to the first chamber in said back plate, with the distal end of said second drive block contacting said second slidable rod along the length of the second slidable rod between the distal end and the proximal end, and the proximal end of said second drive block contacting one side of a second lock bar, with the opposite side of said second lock bar configured to mate with one of a series of parallel grooves disposed in an arc formed in the rear end of the mid plate when said back plate and said mid plate are in a first angular orientation and with one other of the series of grooves when said back plate and said mid plate are in a second angular orientation, and at least a fourth spring contacting the one side of the second lock bar at one end and at its opposite end contacting an internal wall of the second chamber of the back plate, wherein the distal end of the second drive block contacts a portion of the length of the second slidable rod other than the notch to retain the second lock bar in one of the series of grooves in the mid plate, and wherein the distal end of the second drive block contacts the notch of the second slidable rod to release the second lock bar from one of the series of grooves of the mid plate so that the back plate may be pivoted to a different angular orientation in relation to the mid plate.

20. The shoulder rest for a camera of claim 12, wherein the adapter assembly is slidably movable with respect to the tilt plate along the dovetail connections.

21. The shoulder rest for a camera of claim 12, further comprising a primary dovetail lock actionable by a lever that when engaged prevents sliding movement of the adapter assembly with respect to the tilt plate along the dovetail connections.

22. The shoulder rest for a camera of claim 14, wherein a first cushioning element is removably attached to a bottom surface opposite the first portion of the top surface and a second cushioning element is removably attached to a bottom surface opposition the second portion of the main frame.

23. The shoulder rest for a camera of claim 15, further comprising a camera battery removably attachable to the fixture.

24. The shoulder rest for a camera of claim 6, wherein the cushioning element is attached with hook and loop fasteners.

25. The shoulder rest for a camera of claim 19, further comprising:
a third pivot lock assembly comprising a fourth spring insertable into a first chamber in said front plate, a third slidable rod having a distal end and a proximal end and defining a length between the distal end and proximal end, said third slidable rod defining a notch or recess along its length, said third slidable rod insertable into the first chamber in said front plate with its distal end in contact with said fourth spring, a third drive block having a distal end and a proximal end, said third drive block insertable into a second chamber in said front plate that is oriented orthogonal or substantially orthogonal to the first chamber in said front plate, with the distal end of said third drive block contacting said third slidable rod along the length of the third slidable rod between the distal end and the proximal end, and the proximal end of said third drive block contacting one side of a third lock bar, with the opposite side of said third lock bar configured to mate with one of a series of parallel grooves disposed in an arc formed in the front end of the main frame when said front plate and said main frame are in a first angular orientation and with one other of the series of grooves when said front plate and said main frame are in a second angular orientation, and at least a fifth spring contacting the one side of the third lock bar at one end and at its opposite end contacting an internal wall of the second chamber of the front plate, wherein the distal end of the third drive block contacts a portion of the length of the third slidable rod other than the notch to retain the third lock bar in one of the series of grooves in the main frame, and wherein the distal end of the third drive block contacts the notch of the third slidable rod to release the third lock bar from one of the series of grooves of the main frame so that the front plate may be pivoted to a different angular orientation in relation to the main frame.

* * * * *